United States Patent
Boytsov et al.

(10) Patent No.: US 12,026,187 B2
(45) Date of Patent: Jul. 2, 2024

(54) INTERACTION LAYER NEURAL NETWORK FOR SEARCH, RETRIEVAL, AND RANKING

(71) Applicant: Robert Bosch GmbH, Stuttgart (DE)

(72) Inventors: Leonid Boytsov, Pittsburgh, PA (US); Jeremy Kolter, Pittsburgh, PA (US)

(73) Assignee: Robert Bosch GmbH (DE)

( * ) Notice: Subject to any disclaimer, the term of this patent is extended or adjusted under 35 U.S.C. 154(b) by 501 days.

(21) Appl. No.: 17/169,931

(22) Filed: Feb. 8, 2021

(65) Prior Publication Data

US 2022/0253447 A1     Aug. 11, 2022

(51) Int. Cl.
*G06F 16/33* (2019.01)
*G06F 40/284* (2020.01)
*G06N 3/08* (2023.01)

(52) U.S. Cl.
CPC ........ *G06F 16/3346* (2019.01); *G06F 40/284* (2020.01); *G06N 3/08* (2013.01)

(58) Field of Classification Search
CPC ................. G06F 40/284; G06N 3/08
See application file for complete search history.

(56) References Cited

U.S. PATENT DOCUMENTS

| | | | | |
|---|---|---|---|---|
| 2008/0059187 A1* | 3/2008 | Roitblat | ............. | G06F 16/3344 707/999.005 |
| 2020/0175015 A1* | 6/2020 | Al Hasan | ............. | G06F 16/355 |
| 2021/0374350 A1* | 12/2021 | Nishida | ................ | G06F 40/279 |

FOREIGN PATENT DOCUMENTS

| | | | | |
|---|---|---|---|---|
| CN | 104731777 A | * | 6/2015 | |
| CN | 110059324 A | * | 7/2019 | ........... G06F 17/289 |
| WO | WO-2016103409 A1 | * | 6/2016 | |

OTHER PUBLICATIONS

Vulic et al., "Monolingual and Cross-Lingual Information Retrieval Models Based on (Bilingual) Word Embeddings", SIGIR '15: Proceedings of the 38th International ACM SIGIR Conference on Research and Development in Information RetrievalAug. 2015 pp. 363-372https://doi.org/10.1145/2766462.2767752 (Year: 2015).*

Sugathadasa et al., "Legal Document Retrieval Using Document Vector Embeddings and Deep Learning" Nov. 2018, Part of the Advances in Intelligent Systems and Computing book series (AISC, vol. 857) (Year: 2018).*

Berger, A., Lafferty, J.: Information retrieval as statistical translation. In: SIGIR. pp. 222-229 (1999), 8 pages.

(Continued)

*Primary Examiner* — Hosain T Alam
*Assistant Examiner* — Robert F May
(74) *Attorney, Agent, or Firm* — Dickinson Wright PLLC

(57) ABSTRACT

A linguistic system includes a controller. The controller may be configured to receive a query and document, tokenize the query into a sequence of query tokens and tokenize the document into a sequence of document tokens, generate a matrix of token pairs for each of the query and the document tokens, retrieve for each entry in the matrix of token pairs, a precomputed similarity score produced by a neural conditional translation probability network, wherein the neural network has been trained in a ranking task using a corpus of paired queries and respective relevant documents, produce a ranking score for each document with respect to each query via a product-of-sum aggregation of each of the similarity scores for the respective query; and output the document and associated ranking score of the document.

19 Claims, 5 Drawing Sheets

(56) References Cited

OTHER PUBLICATIONS

Zbib, R., Zhao, L., Karakos, D.G., Hartmann, W., DeYoung, J., Huang, Z., Jiang, Z., Rivkin, N., Zhang, L., Schwartz, R. M., Makhoul, J.: Neural-network lexical translation for cross-lingual IR from text and speech. In: SIGIR. pp. 645-654. ACM (2019), 10 pages.

MacAvaney, S., Yates, A., Cohan, A., Goharian, N.: CEDR: contextualized embeddings for document ranking. In: SIGIR. pp. 1101-1104. ACM (2019), 4 pages.

* cited by examiner

INTERACTION LAYER NEURAL NETWORK FOR SEARCH, RETRIEVAL, AND RANKING

TECHNICAL FIELD

This application generally relates to the use of neural networks in multi-stage retrieval systems. More specifically, this application relates to improvements in the interaction layer of a neural network used for retrieval of documents and ranking of documents in information retrieval systems.

BACKGROUND

Linguistics is the scientific study of language and involves analysis of language form, language meaning, and language in context, as well as an analysis of the social, cultural, historical, and political factors that influence language. Information retrieval systems, such as internet search systems operate on a massive scale indexing millions of web pages to make the information searchable through user submitted queries. The goal of such a search system is to quickly identify those documents that are relevant to a user's query and return relevant search results. A typical text retrieval system relies on simple term/token-matching techniques to generate an initial list of candidates, which can be further re-ranked using a learned model. Thus, retrieval performance is adversely affected by a mismatch between query and document terms, which is known as a vocabulary gap problem. Two decades ago Berger and Lafferty proposed to reduce the vocabulary gap and, thus, to improve retrieval effectiveness with a help of a lexical translation model called IBM Model 1. IBM Model 1 has strong performance when applied to finding answers in English question-answer (QA) archives using questions as queries as well as to cross-lingual retrieval. In prior work Model 1 is trained on question-document pairs of similar lengths which simplifies the task of finding useful associations between query terms and terms in relevant documents. Furthermore, these models have been trained in a translation task using primarily a variant of a traditional expectation-maximization (EM) algorithm that produces a non-parametric model.

SUMMARY

A linguistic system includes a controller. The controller may be configured to receive a query and documents, tokenize the query into a sequence of query tokens and tokenize each one of the documents into a sequence of document tokens, convert the query tokens to query embeddings and convert the document tokens to document embeddings, generate a matrix of embedding pairs for each of the query and the document embeddings, compute, via a neural conditional translation probability network for each entry in the matrix of embedding pairs, a similarity score wherein the neural network has been trained in a ranking task using a corpus of paired queries and respective relevant documents, produce a ranking score for each document with respect to each query via a product-of-sum aggregation of the similarity scores for the respective query, order the documents according to the ranking score of the documents; and output the document and associated ranking score of the document.

A linguistic system includes a controller. The controller may be configured to receive a query and document, tokenize the query into a sequence of query tokens and tokenize the document into a sequence of document tokens, generate a matrix of token pairs for each of the query and the document tokens, retrieve for each entry in the matrix of token pairs, a precomputed similarity score produced by a neural conditional translation probability network, wherein the neural network has been trained in a ranking task using a corpus of paired queries and respective relevant documents, produce a ranking score for each document with respect to each query via a product-of-sum aggregation of each of the similarity scores for the respective query; and output the document and associated ranking score of the document.

A non-transitory computer readable medium comprising instructions for neural conditional translation probability network ranking that, when executed by a processor of a computing device, cause the computing device to perform operations. The operations include receive a query and documents, tokenize the query into a sequence of query tokens and tokenize, for each document, the documents into a sequence of document tokens, convert the query tokens to query embeddings and convert the document tokens to document embeddings, generate a matrix of embedding pairs for each of the query and the document embeddings, compute, via a neural conditional translation probability network for each entry in the matrix of embedding pairs, a similarity score wherein the neural network has been trained in a ranking task using a corpus of paired queries and respective relevant documents, produce a ranking score for each document with respect to each query via a product-of-sum aggregation of each of the similarity scores for the respective query, and output an order of the documents according to the ranking score of the documents.

DETAILED DESCRIPTION

Figure 1:
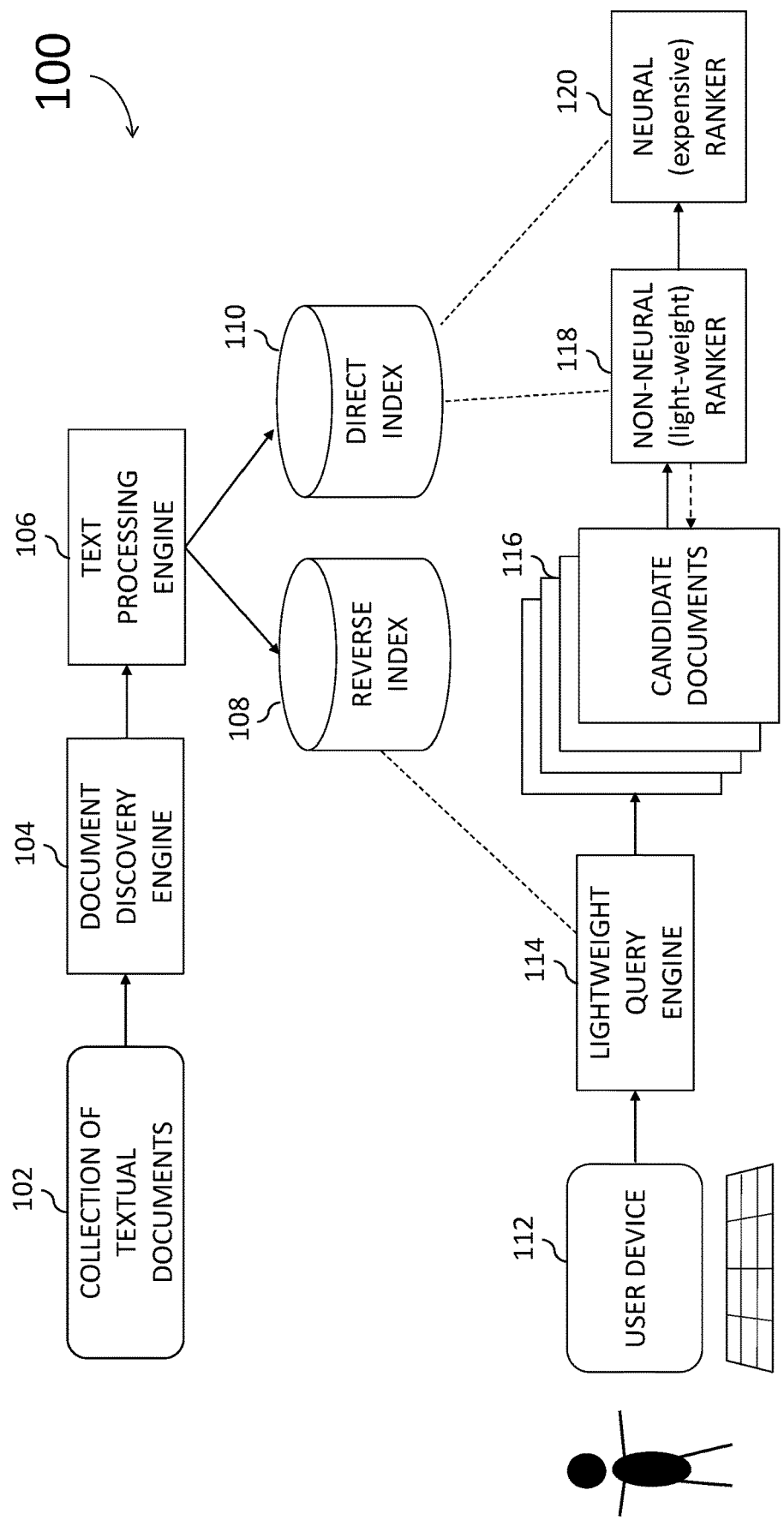
FIG. 1 is a block diagram of a search/retrieval system.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The term "substantially" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

First consider the utility of the lexical translation model (e.g., IBM Model 1) for English text retrieval, in particular, its neural variants that are trained end-to-end. Then use a neural variant of IBM Model 1 as an interaction layer applied to the sequence of query/document embeddings produced in a context-free or contextualized fashion. This new approach to design a neural ranking system has benefits for effectiveness, efficiency, and interpretability which is crucial. Specifically, this disclosure illustrates that adding the neural Model 1 layer on top of a Bidirectional Encoder Representations from Transformers (BERT)-based contextualized embeddings (1) does not decrease accuracy and/or efficiency; and (2) may overcome the limitation on the maximum sequence length of existing BERT models. The lexical, (i.e., context-free), neural Model 1 is less effective than a BERT-based ranking model, but it can run efficiently on a controller, processor, CPU, GPU, or other computational or logic circuit (without expensive index-time preprocessing).

A typical text retrieval system relies on simple term-matching techniques to generate an initial list of candidates, which can be further re-ranked using a learned model. Thus, retrieval performance is adversely affected by a mismatch between query and document terms, which is known as a vocabulary gap problem. Two decades ago a method was proposed to reduce the vocabulary gap and, thus, to improve retrieval effectiveness with a help of a lexical translation model called IBM Model 1 (also referred to as Model 1). Model 1 has strong performance when applied to finding answers in English question-answer (QA) archives using questions as queries as well as to cross-lingual retrieval. Yet, little is known about its effectiveness on realistic monolingual English queries, partly, because training Model 1 requires large query sets, which previously were not publicly available.

The Model 1 may be trained on question-document pairs of similar lengths which simplifies the task of finding useful associations between query terms and terms in relevant documents. However, consider training the Model 1 if the queries are substantially, e.g., two orders of magnitude, shorter than corresponding relevant documents. Furthermore, these models have been trained in a translation task using primarily a variant of a traditional expectation-maximization (EM) algorithm that produces a non-parametric model.

This disclosure presents a better option by parameterizing conditional translation probabilities with a neural network and learning the model end-to-end in a ranking—rather than a translation—task.

Further investigation was performed with lexical translation models on two recent MS MARCO collections, which have hundreds of thousands of real user queries. Specifically, consider a novel class of ranking models where an interpretable neural Model 1 layer is applied to an output of a token-embedding neural network. The layer produces all pairwise similarities T(q|d) among query and documents BERT word pieces, which are combined via a straightforward product-of-sum formula without any learned weights:

$$P(Q|D) = \prod_{q \in Q} \sum_{d \in D} T(q|d)P(d|D)$$

in which Q is query, D is the document, q is query token, d is document token, T (q|d) is a conditional translation probability of query token q (a probability of being aligned with document token d), P(Q|D) is the ranking score (interpreted as a conditional probability of query given a document), and P(d|D) is a maximum likelihood estimate of the probability of occurrence of token d being in document D.

A ranking score P(Q|D) is a product of scores for individual query word pieces, which makes it easy to pinpoint word pieces with largest contributions. Likewise, for every query word piece it is possible to identify document word pieces with highest contributions to its score. This makes the disclosed model more interpretable compared to prior work.

The resulting composite network (including token embeddings) is learned end-to-end using a ranking objective. Consider two scenarios: context-independent token embeddings and contextualized token embeddings generated by BERT. Note that the approach presented in this disclosure is generic and can be applied to other embedding networks as well.

The findings of this work can be summarized as follows:

First, adding an interpretable neural Model 1 layer on top of BERT entails virtually no loss in accuracy and efficiency compared to the vanilla BERT ranker, which is not readily interpretable. In fact, for long documents the BERT-based interpretable neural Model 1 may outperform baseline models applied to truncated documents, thus, overcoming the limitation on the maximum sequence length of existing pretrained Transformer models.

A fusion of the non-parametric Model 1 with BM25 scores can outperform the baseline fusion models, but the gain is quite small ($\approx 3\%$). In that, a context-free neural Model 1 can be substantially more effective than its non-parametric variant.

The context-free Model 1 can be sparsified, exported to a non-parametric format, and executed on a CPU more than $10^3$ times faster compared to running a BERT-based ranker on a GPU. It can, thus, improve the candidate generate phase without expensive index-time precomputation approaches such as doc2query.

The use of statistical translation methods in text retrieval was successfully applied to finding answers in QA archives using questions as queries In that, the model is trained on a large monolingual collection of questions paired with user-provided answers, i.e., on a parallel monolingual corpus. Model 1 has been also useful for cross-lingual retrieval.

Model 1 is a non-parametric translation model where context-independent translation probabilities of lexemes (or tokens) are learned using an expectation maximization (EM) algorithm from a parallel corpus. A generic approach to improve performance of non-parametric statistical learning models consists in parameterizing respective probabilities using neural networks. An early successful implementation of this idea in language processing were the hybrid HMI DNN/RNN (Hidden Markov Models Deep Neural Network/Recurrent Neural Network) systems for speech recognition. More concretely, this disclosure uses the neural Model 1 as a last network layer which computes query document likelihoods that are based on the LSTM-CRF (Long short-term memory-conditional random field) and CEDR (Contextualized Embeddings for Document Ranking) architectures.

Consider a context-dependent lexical neural translation model for cross-lingual retrieval. This approach used context-dependent translation probabilities from a bilingual parallel corpus in a lexical translation task. Given a document, highest translation probabilities together with respective tokens are precomputed in advance and stored in the index. One would need to train the model on aligned sentences of similar lengths. In the case of monolingual retrieval, however, this disclosure does not have such fine-grained training data as queries are paired only with much longer relevant documents.

Neural ranking models have been a popular topic in recent years. However, the success of early approaches—which predate BERT—was controversial. The situation has changed with adoption of large neural models pretrained in a self-supervised fashion, especially after the introduction of the Transformer models and release of BERT. It is thought that BERT-based models dramatically outperformed all other approaches. BERT and its variants have also dominated the MS MARCO leaderboard.

Before Transformers, LSTMs (Long short-term memory) and other recurrent neural networks were a major approach for classification and translation of sequence data. Transformers do not have an inherent limitation on a sequence length. However, a recently proposed Transformer model employs an attention mechanism where each sequence position can attend to all the positions in the previous layer. Because self-attention complexity is quadratic with respect to a sequence length, Transformer models (BERT including) support only limited-length inputs. There is a number of proposals to mitigate this constraint, e.g., a Conformer-kernel ranking model uses the so-called separable attention. This line of research is complementary to this work.

To process longer documents with existing pretrained models, a system would have to split documents into several chunks, process each chunk separately, and aggregate results, e.g., by computing a maximum or a weighted prediction score. Such models cannot be trained end-to-end on full documents. Furthermore, a training procedure has to assume that each chunk in a relevant document is relevant as well, which is not always accurate. To improve upon simple aggregation approaches, a combined output of several document chunks using three simpler models: KNRM (Kernel-based Neural Ranking Model), PACRR (PACRR: A Position-Aware Neural IR Model for Relevance Matching), and DRMM (Deep Relevance Matching Model) has been introduced. However, none of the aggregator models is interpretable.

Interpretation and explanation of statistical models has become a busy area of research. However, a vast majority of approaches rely on training a separate explanation model or exploiting saliency/attention maps. This is problematic, because explanations provided by extraneous models are difficult to verify and trust. Furthermore, saliency and attention maps reveal which data parts are being processed by a model, but not how the model processes them. Instead of constructing unreliable post hoc explanations, one method advocates for networks whose computation is transparent by design. When a fully transparent network is not feasible, there is still a benefit of last-layer interpretability. In text retrieval, consider the use of a kernel-based formula to compute soft-match counts over contextualized embeddings. Because each pair of query-document tokens produces several soft-match values corresponding to different thresholds, it is problematic to aggregate these values in an explainable way. Although this approach does offer insights into model decisions, the aggregation formula is pretty complicated. It is essentially a two-layer neural network with a non-linear (logarithm) activation function after the first layer. In contrast, the use of an interpretable Model 1 layer produces a single similarity score for each pair of query and document subword token. These scores are combined using a straightforward product-of-sums formula, which does not have any learned weights (see Eq. 1).

Methods to speed-up query-time ranking by deferring some computation to index time can be divided into two groups. The first group includes generation of partially disentangled representations, which can be quickly combined at query-time. These approaches entail little to no performance degradation. The second group of methods produces, or enhances, independent query and document representations that can be compared by computing the inner product. Representations—either dense or sparse—were shown to improve the first-stage retrieval albeit at the cost of expensive indexing processing and some loss in effectiveness.

Among sparse representations, DeepCT (Deep Contextualized Term Weighting) uses BERT to generate importance weights for both document and query terms, doc2query learns to augment documents with most likely query terms, while the Epic model combines document expansion with term re-weighting. These models are less effective than the vanilla BERT ranker and require costly index-time processing. By virtue of sparsity of data generated by term expansion and re-weighting models, it can be stored in a traditional inverted file to improve performance of the first retrieval stage. Although it is difficult to explain a model's expansion and re-weighting decisions, because the first retrieval stage usually employs a transparent ranking formula such as BM25, it can be fairly easy to determine which term matches contributed most to query-document scores. This makes expansion and re-weighting models partially interpretable.

Turning to Token Embeddings, Vanilla BERT, and CEDR, assume that an input text is split into small chunks of texts called tokens. This process is called tokenization. A token can be a complete English word, a word piece, or a lexeme (a lemma). The length of a document d is measured in the number of tokens and is denoted by $|d|$. Because neural networks cannot operate directly on textual data, a sequence of tokens $t_1 t_2 \ldots t_n$ is first converted to a sequences of d-dimensional vectors $w_1 w_2 \ldots w_n$ by an embedding sub-network. These vectors are also referred to as embeddings. Initially, the embedding sub-networks were context independent, i.e., each token was always mapped to the same vector. The superiority of context-dependent, i.e., contextualized, embeddings produced a multi-layer bi-directional LSTM pretrained on a large corpus in a self-supervised manner were recently demonstrated. These were shortly outstripped by large pretrained Transformers.

This disclosure includes two types of embeddings: vanilla context-free embeddings and BERT-based contextualized embeddings. Regarding BERT architecture, a few important things to consider are:

Contextualized token embeddings are values of the last-layer hidden states;

BERT operates on word pieces rather than complete words;

The vocabulary has close to 30K tokens and includes two special symbols [CLS] (an aggregator) and [SEP] (a separator); and

[CLS] is always prepended to every token sequence and its embedding is used as a sequence representation for classification and ranking tasks.

The "vanilla" BERT ranker uses a single fully-connected layer as a prediction head, which converts the [CLS] vector into a scalar. It makes a prediction based on the following sequence of tokens: [CLS] q [SEP] d [SEP], where q is a query and $d = t_1 t_2 \ldots t_n$ is a document. Long documents and queries need to be truncated so that the overall number of tokens does not exceed 512. To overcome this limitation, consider an approach that:

splits longer documents d into several chunks: $d = d_1 d_2 \ldots d_m$;

generates m token sequences [CLS] q [SEP] $d_i$ [SEP]; and processes each sequence with BERT to generate contextualized embeddings for regular tokens as well as for [CLS].

The outcome of this is m [CLS]-vectors $cls_i$ and n contextualized vectors $w_1 w_2 \ldots w_n$: one for each document token $t_i$. There are several approaches to combine these contextualized vectors. One approach is to extend the vanilla BERT ranker by making prediction on the average [CLS] token:

$$\frac{1}{m}\sum_{i=1}^{m} cls_i.$$

A second approach is to use contextualized embeddings as a direct replacement of context-free embeddings in the following neural architectures: KNRM, PACRR, and DRMM.

In a third approach introduced a CEDR architecture, the [CLS] token/vector is additionally incorporated into KNRM, PACCR, and DRMM in a model-specific way, which further boosts performance.

Non-parametric and Neural Model 1. Include a proposal to recast retrieval as a translation problem with an objective to learn a soft-matching function that assigns non-zero weights to related but different terms (e.g., synonyms). To this end, consider employing a simple Model 1, which is a term-independent and context-free model.

Let P(D|q) denote a probability that a document D is relevant to the query q.

Using the Bayes rule, P(D|q) is convenient to re-written as $P(D|q) \propto P(q|D)p(D)$. Furthermore, assuming a uniform prior for the document occurrence probability p(D), the relevance probability is proportional to P(q|D), which, in turn, can be computed as a document-to-query translation.

Let T(q|d) be a probability that a query token q is a translation of a document token d and P(d|D) is a probability that a token d is "generated" by a document D. Then, a probability that query Q is a translation of document D can be computed as a product of individual query term likelihoods as follows:

$$P(Q|D) = \prod_{q \in Q} P(q|D) \quad (1)$$

$$P(q|D) = \sum_{d \in D} T(q|d) P(q|D)$$

Making Model 1 effective requires a number of techniques, which are largely different between the non-parametric and the neural variants. For the nonparametric Model 1, P(q|D)—a likelihood of a query term q—is linearly combined with the collection probability P(q|C) using a parameter λ:

$$P(q|D) = (1-\lambda)\left[\sum_{d \in D} T(q|d)P(q|D)\right] + \lambda P(q|C). \quad (2)$$

Both the collection probability P(q|C) and the in-document term probability P(d|D) are maximum likelihood estimates, i.e., normalized frequencies of occurrence. For an out-of-vocabulary term q, P(q|C) is set to a small number (e.g., $10^{-9}$). Translation probabilities T(q|d) are computed using the EM algorithm implemented in MGIZA. MGIZA models spurious insertions (i.e., a translation from an empty word), but this can be discarded. Next consider several additional measures to improve Model 1 effectiveness:

A parallel corpus is created by splitting documents and passages into small contiguous chunks whose length is comparable to query lengths;

Conditional translation probabilities T(q|d) are learned from a symmetrized corpus;

Discard all translation probabilities T(q|a) below an empirically found threshold of about $10^{-3}$ and keep at most $10^6$ most frequent tokens; and Set T(t|t), a self-translation probability, to an empirically found positive value and rescale probabilities T($t_0$|t) so that $\Sigma_{t_0} T(t_0|t)=1$.

In the case of a neural translation model, consider a simpler Eq. 1, which does not smooth translation and collection probabilities. The translation probability T(q|d) is computed by a simple neural network, whose input are context-free or contextualized embeddings of tokens q and d. For context-free embeddings, P(d|D) is equal to the number of occurrences of term d in the document divided by |D|. However, contextualization of token embeddings produces essentially non-repeating tokens. Thus, we set $P(d|D)=1/|D|$ for BERT-based embeddings.

$$P(Q|D) = \prod_{q \in Q} \sum_{i=1}^{|D|} \frac{T(embed_q(q) | embed_d(d_i))}{|D|} \quad (3)$$

in which Q is query, D is the document, q is the query token, d is the document token, $embed_q$ (q) is the embedding (vector) of the query token, $embed_d$ ($d_i$) is the embedding (vector) of the document token $d_i$, T is a conditional translation probability, and P(Q|D) is the ranking score, which is interpreted as conditional probability of the query Q given the document D.

Likewise, in a contextualized embedding setting, $$P(Q|D) = \prod_{q \in Q} \sum_{i=1}^{|D|} \frac{T(embed_q(q, d_i) | embed_d(q, d_i))}{|D|} \quad (4)$$

in which Q is query, D is the document, q is query token, d is document token, $embed_q$ (q,$d_i$) is contextualized embedding of the query token, $embed_d$ (q,$d_i$) is contextualized embedding of the document token $d_i$, T is a conditional translation, and P is the ranking score.

Note that the context-free neural Model 1 can be sparsified and exported into a non-parametric format, which permits an extremely efficient execution on CPU. This is done by precomputing $T(t_1|t_2)$ for all pairs of vocabulary tokens and discarding all values smaller than a threshold.

Further compute T(q|d) in Eq. 3 by a simple and efficient neural network. Networks "consumes" context-free or contextualized embeddings of tokens q and d and produces a value in the range [0,1]. To incorporate a self-translation probability—crucial for good convergence of the context-free model—we set $T(t|t)=p_{self}$ and multiply all other probabilities by $1-p_{self}$. However, it was not practical to scale conditional probabilities to ensure that $\forall t_2 \Sigma_{t_1} T(t_1|t_2)=1$. Thus, $T(t_1|t_2)$ is a similarity function, but not a true probability distribution.

It can be shown that using a small self-translation probability $p_{self}=0.05$ greatly improves convergence of the context-free model. In that, a proper scaling of conditional probabilities such that for any token $t_2$ we have $\Sigma_{t_1} T(t_1|t_2)=1$ is not efficient for context-free embeddings and even senseless for contextualized ones (because embedding vector of the same token varies among different contexts). Thus, do not normalize conditional probabilities, but constrain the output of the neural network $T(t_1|t_2)$ to be in the range [0,1]. Furthermore, set $T(t|t)=p_{self}$ and multiply all other probabilities by $1-p_{self}$.

Several approaches to design a neural parametrization for $T(t_1|t_2)$ were considered. Consider using $embed_q(t_1)$ and $embed_d(t_2)$ to denote embeddings of query and document tokens, respectively. Perhaps, the simplest approach is to learn separate sets of embeddings for queries and documents and compute probability as the scaled cosine similarity: $T(t_1..t_2)=0.5\{cos(embed_q(t_1),embed_d(t_2))+1\}$. However, this neural network is not sufficiently expressive and the resulting context-free Model 1 is inferior to the non-parametric Model 1 learned via EM.

It can be shown that a key ingredient to good performance is a concatenation of embeddings with their Hadamard product, which we think helps the following layers discover better interaction features. Then pass it through one or more fully-connected linear layers with RELUs followed by a sigmoid:

$$T(q|d)=\sigma(F_3(relu(F_2(relu(f_1([x_q, x_d, x_q \circ x_d]))))))$$

$$x_q=P_q(tanh(layer\text{-}norm(embed_q(q))))$$

$$x_d=P_d(tanh(layer\text{-}norm(embed_d(d)))),$$

where $P_q$, $P_d$, and $F_i$ are fully-connected linear projection layers; [x, y] is vector concatenation; and layer-norm is layer normalization. $x \circ y$ is a Hadamard product of vectors x and y.

TABLE 1

MS MARCO data set details

|  | documents | passages |
|---|---|---|
| general statistics | | |
| # of documents | 3.2M | 8.8M |
| # of doc. lemmas | 476.7 | 30.6 |
| # of query lemmas | 3.2 | 3.5 |
| # of queries | | |
| train/fusion | 10K | 20K |
| train/modeling | 357K | 788.7K |
| development | 2500 | 20K |
| test | 2693 | 3000 |
| TREC 2019 | 100 | 100 |
| TREC 2020 | 100 | 100 |

Data sets: When experimenting with a MS MARCO collections, which include data for passage and document retrieval tasks. Each MS MARCO collection has a large number of real user queries (see Table 1). There are no other collections comparable to MS MARCO in this respect. The large set of queries is sampled from the log of the search engine Bing. In that, data set creators ensured that all queries can be answered using a short text snippet. These queries are only sparsely judged (about one relevant passage per query). Sparse judgments are binary: Relevant documents have grade one and all other documents have grade zero.

In addition to large query sets with sparse judgments, two evaluation sets from TREC 2019/2020 deep learning tracks were used. These query sets are quite small, but they have been thoroughly judged by NIST assessors separately for a document and a passage retrieval task. TREC NIST judgements range from zero (not-relevant) to three (perfectly relevant).

Publicly available training and validation sets were randomly split into the following subsets: a small training set to train a linear fusion model (train/fusion), a large set to train neural models and non-parametric Model 1 (train/modeling), a development set (development), and a test set (test) containing at most 3K queries. Detailed data set statistics is summarized in Table 1. Note that the training subsets were obtained from the original training set, whereas the new development and test sets were obtained from the original development set.

Next was processing the collections using Spacy 2.2.3 to extract tokens and lemmas (lexemes) from text. The frequently occurring tokens and lemmas were filtered out using Indri's list of stopwords, which were expanded to include a few contractions such as "n't" and "'ll". Lemmas were indexed using Lucene 7.6. Sub-word tokens, namely BERT word pieces, were generated using HuggingFace Transformers library. The stopword list was not applied to BERT word pieces.

Basic Setup. An experiment on a Linux server equipped with a six-core (12 threads) i7-6800K 3.4 Ghz CPU, 125 GB of memory, and four GeForce GTX 1080 TI GPUs. It used a text retrieval framework FlexNeuART, which is implemented in Java. It used Lucene 7.6 with a BM25 scorer to generate an initial list of candidates, which can be further re-ranked using either traditional or neural re-rankers. The traditional re-rankers, including the non-parametric Model 1, are implemented in Java as well. They run in a multi-threaded mode (12 threads) and fully utilize the CPU. The neural rankers are implemented using PyTorch 1.4 and Apache Thrift. A neural ranker operates as a standalone single-threaded server.

Ranking speed is measured as the overall CPU/GPU throughput—rather than latency—per one documents/passages. Ranking accuracy is measured using the standard utility trec_eval provided by TREC organizers. Statistical significance is computed using a two-sided t-test with the threshold 0.05.

All ranking models are applied to the candidate list generated by a tuned BM25 scorer. BERT-based models re-rank 100 entries with highest BM25 scores: using a larger pool of candidates hurts both efficiency and accuracy. All other models, including the neural context-free Model 1 re-rank 1000 entries: Further increasing the number of candidates does not improve accuracy.

Training Models. Neural models are trained using a pairwise margin loss. Training pairs are obtained by combining known relevant documents with 20 negative examples selected from a set of top-500 candidates returned by Lucene. In each epoch, randomly sample one positive and one negative example per query. BERT-based models first undergo a target-corpus pretraining using a masked language modeling and next-sentence prediction objective. Then, train them for one epoch a ranking task. Use batch size 16 simulated via gradient accumulation. Context-free Model 1 is trained from scratch for 32 epochs using batch size 32. The non-parametric Model 1 is trained for five epochs with MGIZA. Further increasing the number of epochs does not substantially improve results.

Use a small weight decay ($10^{-7}$) and a warm-up schedule where the learning rate grows linearly from zero for 10-20% of the steps until it reaches the base learning rate. The optimizer includes AdamW. For BERT-based models use different base rates for the fully-connected prediction head ($2 \cdot 10^{-4}$) and for the main Transformer layers ($2 \cdot 10^{-5}$). For the context-free Model 1 the base rate is $3 \cdot 10^{-3}$, which is decayed by 0.9 after each epoch. It is the same for all parameters. The trained neural Model 1 is exported to a non-parametric format by precomputing all pairwise translation probabilities and discarding probabilities smaller than $10^{-4}$. Export takes three minutes and the exported model is executed using the same Java code as the non-parametric Model 1.

Each neural model and the sparsified Model 1 is trained and evaluated for five seeds (from zero to four). To this end, compute the value for each query and seed and average query-specific values. All hyper-parameters are tuned on a development set.

Because context-free Model 1 rankers are not strong on their own, evaluate them in a fusion mode. First, Model 1 is trained on train/modeling. Then linearly combine model's score with BM25 scores. Optimal weights are computed on a train/fusion subset using the coordinate ascent algorithm from RankLib. To improve effectiveness of this linear fusion, use Model 1 log-scores are normalized by the number of query tokens. In turn, BM25 scores are normalized by the sum of query-term IDF values. Also use a fusion of BM25 scores for different tokenization approaches, which is also trained via RankLib on train/fusion.

Model Overview. Compare several models (see Table 2). First, use BM25 scores computed for the lemmatized text, henceforth, BM25 (lemm). Second, evaluate several variants of the context-free Model 1. The non-parametric Model 1 was trained for both original tokens and BERT word pieces: Respective models are denoted as Model1 (tok) and Model1 (b/tok). The neural context-free Model 1—denoted as NN-Model1—was used only with BERT word pieces. This model was sparsified and exported to a non-parametric format, which runs efficiently on a CPU. Denote it as NN-Model1-exp. Note that context-free Model 1 rankers are not strong on their own, thus, we evaluate them in a fusion mode by combining their scores with BM25 (lemm).

Crucially, all context-free models incorporate exact term-matching signal via either the self-translation probability or via explicit smoothing with the token collection probability (see Eq. 2). Thus, these models should be compared not only with BM25, but also with the fusion model incorporating BM25 scores for original tokens or BERT word pieces. Denote these models as BM25 (lemm)+BM25 (tok) and BM25 (lemm)+BM25 (b/tok) respectively.

A contextualized Model 1 applies the neural Model 1 layer to the contextualized embeddings produced by BERT. Denote this model as BERT-Model1. Due to the limitation of existing pretrained Transformer models, long documents need to be split into chunks each of which is processed, i.e., contextualized, separately. This is done in BERT-Model1 (full), BERT-vanilla (full), and BERT-CEDR models. Another approach is to make predictions on truncated document text. This is done in BERT-Model1 (short) and BERT-vanilla (short). In the passage retrieval task, all passages are short and no truncation or chunking is needed. For BERT-based models, use a base, i.e., 12-layer Transformer model, because it is more practical than a 24-layer BERT-large and performs at par with BERT-large on MS MARCO data.

Several hypothesis using a two-sided t-test were tested:

TABLE 2

Illustrates evaluation results: b/tok denotes BERT word pieces, lemm denotes text lemmas, and tok denotes original tokens. NN-Model1 and NN-Model1-exp are the context-free neural Model 1 and its exported variant that runs on CPU. Both use only b/tok. Statistical significance is denoted by * and #.

| | documents | | | | passages | | | |
|---|---|---|---|---|---|---|---|---|
| | test MRR | TREC 2019 NDCGO10 | TREC 2020 NDCGO10 | rank. speed ms/1K | test MRR | TREC 2019 NDCGO10 | TREC 2020 NDCGO10 | rank. speed ms/1K |
| BM25 (lemm) | 0.270 | 0.544 | 0.524 | 3 | 0.256 | 0.522 | 0.516 | 1 |
| BM25 (lemm) + BM25 (tok) | 0.274 | 0.544 | 0.523 | 57 | 0.265 | 0.517 | 0.521 | 1 |
| BM25 (lemm) + Model1 (tok) | 0.283* | 0.548 | 0.535 | 18 | 0.274* | 0.522 | 0.567* | 3 |
| BM25 (lemm) + BM25 (b/tok) | 0.383 | 0.528 | 0.537 | 44 | 0.270 | 0.518 | 0.525 | 2 |
| BM25 (lemm) + Model1 (b/tok) | 0.284 | 0.557 | 0.525 | 53 | 0.271 | 0.517 | 0.509 | 19 |
| BM25 (lemm) + NN-Model1-exp | 0.307* | 0.568 | 0.545 | 20 | 0.298* | 0.541* | 0.581* | 6 |
| BM25 (lemm) + NN-Model1 | 0.311* | 0.566 | 0.541 | 3030 | 0.300* | 0.549* | 0.587* | 313 |
| BERT-vanilla (short) | 0.387 | 0.655 | 0.623 | 37200 | 0.426 | 0.686 | 0.684 | 10100 |
| BERT-vanilla (full) | 0.376# | 0.667 | 0.631 | 82200 | | | | |
| BERT-Model1 (short) | 0.384 | 0.657 | 0.631 | 36600 | 0.426 | 0.685 | 0.682 | 11700 |
| BERT-Model1 (full) | 0.391# | 0.666 | 0.637* | 83900 | | | | |
| BERT-CEDR-KRNM | 0.387 | 0.665 | 0.649* | 84600 | 0.421* | 0.682 | 0.675 | 10600 |
| BERT-CEDR-DRMM | 0.377* | 0.667 | 0.636 | 114000 | 0.425 | 0.688 | 0.685 | 20100 |
| BERT-CEDR-PACRR | 0.392 | 0.670 | 0.652* | 81500 | 0.425 | 0.690 | 0.684 | 10500 |

Context-free neural Model 1 is the same as respective fusion baselines, e.g., BM25 (lemm)+Model1 (tok) is compared against BM25 (lemm)+BM25 (tok);

BERT-Model1 (full) is the same as the baseline BERT-vanilla (short);

BERT-CEDR models are the same as the baseline BERT-vanilla (short);

BERT-vanilla (full) is the same as the baseline BERT-vanilla (short); and

BERT-Model1 (full) is the same as the baseline BERT-Model1 (short).

The main purpose of these tests is to assess if special aggregation layers (including the neural Model 1) can be more accurate compared to models that run on truncated documents. In Table 2 statistical significance is indicated by a special symbol: the last two hypotheses use #; all other hypotheses use *.

Discussion of Results. The results are summarized in Table 2. First note that there is less consistency in results on TREC 2019/2020 sets compared to test sets. In that, some statistically significant differences (on test) "disappear" on TREC 2019/2020. TREC 2019/2020 query sets are quite small and it is more likely (compared to test) to obtain spurious results. Furthermore, the fusion model BM25 (lemm)+Model1 (b/tok) is either worse than the baseline model BM25 (lemm)+BM25 (b/tok) or the difference is not significant. BM25 (lemm)+Model1 (tok) is mostly better than the respective baseline, but the gain is quite small. In contrast, the fusion of the neural Model 1 with BM25 scores for BERT word pieces is more accurate on all the query sets. On the test sets it is 15-17% better than BM25 (lemm). These differences are significant on both test sets as well as on TREC 2019/2020 tests sets for the passage retrieval task. Sparsification of the neural Model 1 does not lead to a noticeable drop in accuracy. In that, the sparsified model—executed on a CPU—is more than $10^3$ times faster than BERT-based rankers, which run on a GPU. For large candidate sets computation of Model 1 scores can be further improved. Thus, BM25 (lemm)+NN-Model1-exp can be useful at the first retrieval stage.

Finally, comparing the accuracy of BERT-based neural Model 1, to BERT-CEDR and BERT-vanilla models. From comparing BERT-vanilla (short) with BERT-Model1 (short) and BERT-vanilla (long) with BERT-Model1 (long) on the test set (for the document retrieval task) it can be shown that the neural Model 1 layer entails virtually no efficiency or accuracy loss. In that, on test sets BERT-Model1 (full)—which operates on complete documents—is about 1% more accurate compared to both BERT-Model1 (short) and BERT-vanilla (short), However, the latter difference is not statistically significant. In that, the same is true for BERT-CEDR-PACRR, which is also 1% better than BERT-vanilla. This does not invalidate results that show BERT-CEDR-PACRR to be better than BERT-vanilla compared BERT-CEDR-PACRR against the "full" variant of the vanilla BERT ranker, which makes predictions on the averaged [CLS] embeddings. However, in our experiments, this model is noticeably worse (by 4.2%) than a simpler BERT-vanilla (short) model—which operates on truncated text—and the difference is statistically significant. It is believed that obtaining more conclusive evidence about the effectiveness of aggregation layers requires a different data set where relevance of documents and passages is harder to predict from a truncated document.

In experiments with lexical translation models, in particular, with combining the neural Model 1 and a token-embedding network (both contextualized and context-free). It was discovered that the latter has benefits to efficiency and interpretability. And, the neural Model 1 is the only neural model that can be sparsified and exported to a "non-neural" format that can run efficiently on a CPU ($10^3$×faster than BERT on a GPU) without expensive index-time precomputation. The effectiveness of this approach can be further improved, e.g., by designing a better parametrization of conditional translation probabilities. The interpretable neural Model 1 layer may also be useful for effective ranking of long documents, but conclusive experiments require data sets with different characteristics than MS MARCO. It can be showed that the nonparametric Model 1 can be trained via EM even when queries and documents have vastly different lengths, but much better results were obtained by training the context-free neural Model 1 and exporting it to the non-parametric format.

This disclosure presents a mechanism for utilizing a special neural network layer, namely, a lexical translation model (e.g., IBM Model 1), to rank search results. A query and a document are first encoded using a context-free or a contextual neural network (e.g. BERT). As a result, query and document tokens are represented by sequences of vectors. A special lexical neural translation layer then ingests these vectors and produces a matrix of query-term probability-like similarity score. These scores are then combined in an interpretable manner, using a simple product-of-sum formula. When a contextualized network is used, efficient execution often requires a special accelerator, such as a Graphics Processing Unit (GPU) or Tensor Processing Unit (TPU). However, for the context-free encoding network the mechanism relies on the precomputation and the sparsification of the query-document token probability matrix. This permits an efficient execution on a lower performance system, processor, or controller.

A typical text retrieval system relies on simple term/token-matching techniques to generate an initial list of candidates, which can be further re-ranked using a learned model. Thus, retrieval performance is adversely affected by a mismatch between query and document terms, which is known as a vocabulary gap problem. To reduce the vocabulary gap and improve retrieval effectiveness, a lexical translation model called IBM Model 1 was introduced. IBM Model 1 has strong performance when applied to finding answers in English question-answer (QA) archives using questions as queries as well as to cross-lingual retrieval. Model 1 is trained on question-document pairs of substantially similar lengths which simplifies the task of finding useful associations between query terms and terms in relevant documents. These models have been trained in a translation task using primarily a variant of a traditional expectation-maximization (EM) algorithm that produces a non-parametric model. A key step of this disclosure includes parameterizing conditional translation probabilities with a neural network and learning the model end-to-end in a ranking—rather than a translation—task.

Below describes concepts in the simplified form that are not exhaustive and it is not intended to limit the scope of the disclosure, but to present a basic description of concepts, which are discussed in more detail throughout this disclosure.

This disclosure provides a multi-stage retrieval system, which can be used for a variety of domains including, but not limited to, mobile and desktop searches over public and private networks (e.g., World Wide Web). In such a system where documents flow through a series of "funnels" that discard unpromising candidate documents using increasingly more complex and accurate ranking components. Both the query and a document are textual fragments that can be represented by a sequence of tokens. Tokens can be complete words, lexemes (lemmas), word pieces, or multi-word phrases. Splitting a text fragment into tokens is called tokenization or tokenizing.

In a retrieval system, a neural ranking model can be applied to queries and documents to produce estimates of relevance scores. These models are more complex and expensive and, hence, they are used at later stages of a retrieval pipelines. Although these estimates computed with neural ranking models can be quite accurate, they are hard to interpret. This disclosure presents an interpretable neural network layer, a neural lexical translation model (e.g., IBM Model 1), which can be applied to state-of-the-art neural networks such as BERT. Along with efficiency and effectiveness benefits.

In particular, a context-independent lexical translation model can be fully precomputed (such as for all pairs of query and document tokens), sparsified, and efficiently executed on a lower performance system, processor, or controller (e.g., a CPU without the need for expensive accelerators such as GPU and TPU). Although such a model has inferior accuracy to be used for final ranking, it can still improve earlier stage retrieval.

FIG. 1 is a block diagram of a search retrieval system 100. This is a simplified description and does not include all the implementation details. The search retrieval system 100 is intended to simply access to collection of documents 102, which can be stored using a variety of media (e.g., RAM, magnetic, optical, and solid-state storage devices), in variety of formats (e.g., text, rich text format (rtf), Microsoft Word, PDF, etc). It can also be organized in different forms: stored as files in a file system, as a collection hyper-linked documents, or inside fields in a relational database table. A collection can be processed in full or partially. In particular, a document discovery engine 104 (e.g., a Web Crawler or a database querying application) is first use to discover documents worthy of inclusion into the index. A text processing engine 106 recognizes document formats, assigns them (typically) unique identifiers, and extracts textual data. The documents are then stored in (1) a direct (or forward) index 110 that permits fast retrieval of document text using its identifier and (2) a reverse (or inverted) index 108 that permits fast retrieval of documents containing one more tokens.

When a user submits a query (i.e., a search request to find indexed documents) using the user device (e.g., desktop, laptop, smartphone, etc) 112, it employs a multi-stage retrieval pipeline. Although the image shows a keyboard and display, the input to the user device 112 may include a touch screen, a keyboard, a microphone, a camera, a scanner, an image file, or other file or input device. Also, the output to the user device 112 may include a display, a projector, a speaker, or a file or other output devic 200. The first stage uses a lightweight query engine 114, which fetches a relatively large set of candidate documents 116. To this end, it relies on a simple token/term matching techniques and employs a previously created reverse index 108. The subsequent stages employ zero or more non-neural light-weight ranking components 118 to refine the original set of candidates. These re-rankers can be quite efficient and they run on CPU, i.e., they do not require the use of neural network expensive accelerators such as GPU or TPU. And, as neural network rankers 120 are typically computationally expensive, they are used only at latest stages of the retrieval pipeline.

Figure 2:
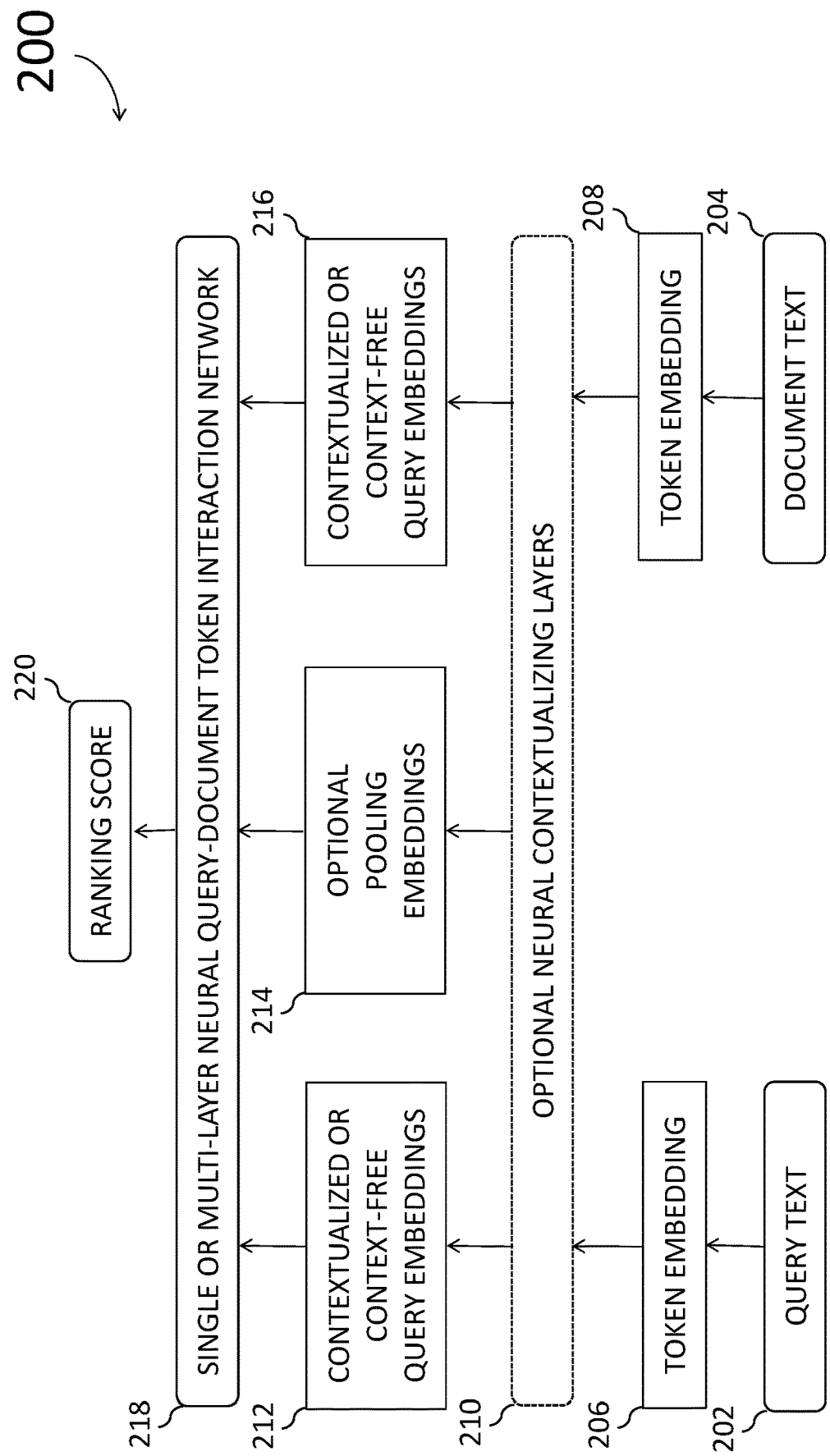
FIG. 2 is a flow diagram of a prior art ranking neural network.

FIG. 2 is a flow diagram of a ranking neural network 200. Consider a problem of assigning a relevance score to a pair of query Q 202 and a document D 204. Both the query 202 and document 204 are textual fragments that can be represented by a sequence of tokens. Tokens can be complete words, lexemes (lemmas), word pieces, or multi-word phrases. Query tokens are denoted by q (possibly with an index) and document tokens are denoted by d (possibly with an index). The length of a document D is measured in the number of tokens and is denoted by |D|.

Because neural networks cannot operate directly on textual data, a sequence of tokens $t_1 t_2 \ldots t_n$ is first converted to a sequences of d-dimensional embedding vectors $w_1 w_2 \ldots w_n$ by an embedding neural network, which consists of one more component.

Typically, such network first produces context-independent embeddings 206 for query tokens and context-independent embeddings 208 for document tokens. Context-independent embeddings for the same query (or document token) are always the same regardless of their position and surrounding tokens. However, they can be different between queries and documents.

After producing context-independent embeddings 206 and 208, an optional neural network 210 such as a Transformer model (e.g., BERT) produces contextualized query token embeddings 212 and contextualized document token embedding 216. These embeddings depend on the context and are never the same unless we have exact tokens in identical contexts.

In addition to contextualized token embeddings, the network 210 can produce one or more (pooling) embedding 214 that represent larger parts of the documents. For example, for every sequence of 512 tokens, BERT produces an embedding vector for the so-called class token [CLS], which represents the whole sequence.

When, an optional contextualizing network 210 is not used 212 is the same as 206 and 216 is the same as 208.

Finally, embeddings 212, 214, and 216 (or in the instant in which the optional neural contextualizing layers 210 is not available, the embeddings 206 and 208) are fed into an interaction neural network, which produces a final query-document ranking score 220. The interaction neural network 218 may be a multi-layer interaction neural network 218.

TRAINING: One approach to training a neural network involves compiling pairs (or lists) of positive and negative documents, which are respectively relevant and non-relevant to a given query, and enforcing ranking scores for relevant documents to be higher than scores for non-relevant documents. This is done by feeding the scores (or their differences) into a special comparison function, which is called a loss function, and minimizing the loss using various optimization approaches. The loss function is intended to be high when a non-relevant document is ranked higher than a relevant one.

A key aspect presented in this disclosure, is that unlike systems that train neural lexical translation models in a translation task, using a parallel corpus, this method allows for systems to train models in a monolingual ranking tasks. A parallel corpus is a set of paired short documents (mostly single-sentence documents) in different languages.

Figure 3:
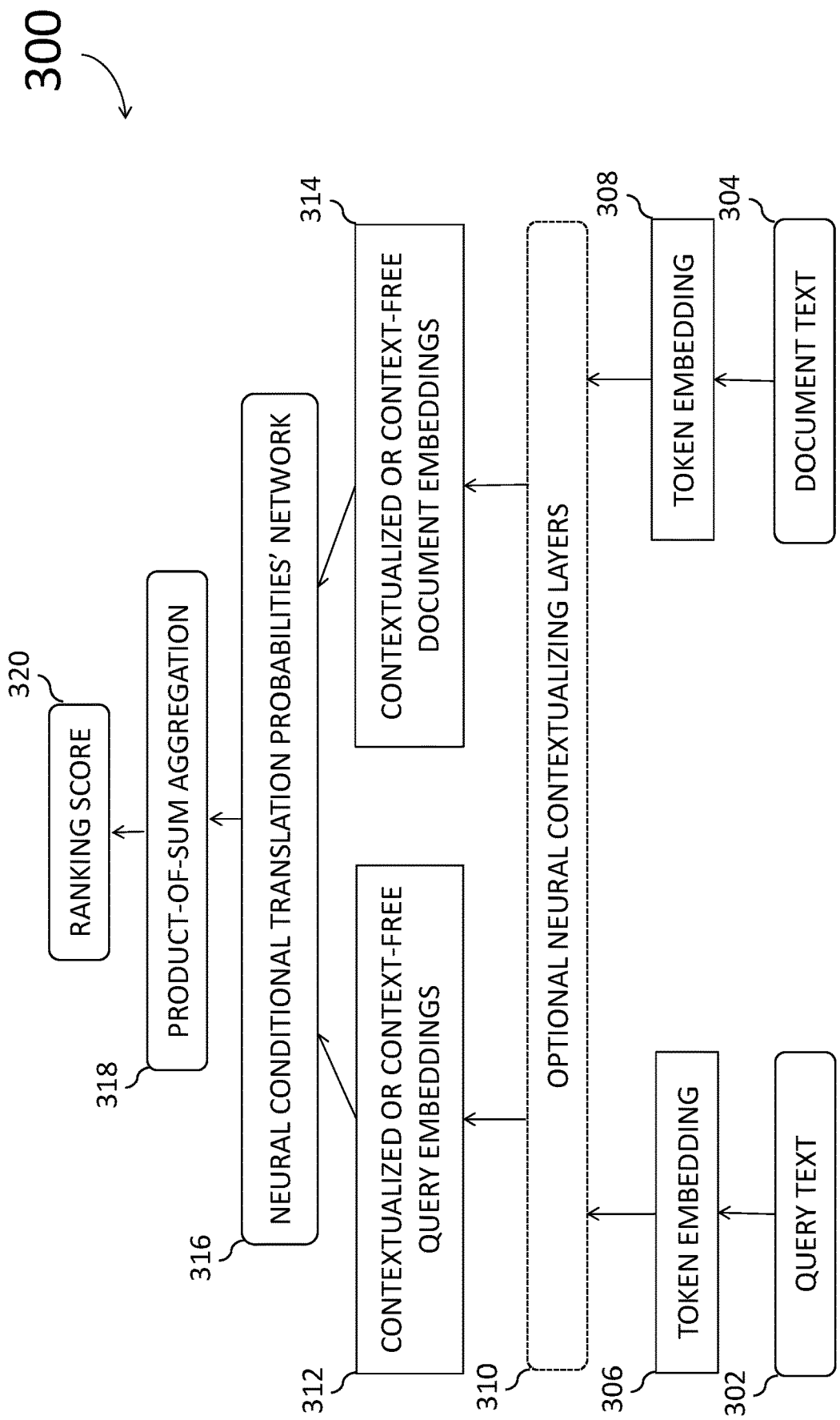
FIG. 3 is a flow diagram of a ranking neural network with a neural conditional translation probabilities' network and product-of-sum aggregation.

A Special Neural Network Layer: FIG. 3 is a flow diagram of a neural ranker architecture 300, that receives query 302 and document 304, generates context-independent embeddings 306 and 308, which are optionally passed through a contextualizing neural network 310. Embeddings 312 and 314 are then processed by aggregation components 316 and 318 to produce the final ranking score 320.

Another key aspect presented in this disclosure is replacing an interaction layer 218 of FIG. 2 with a partially interpretable aggregation components 316 and 318.

First, a neural network 316 produces probability-like translation scores T(q|d) for all pairs of query and document tokens. As explained below, T(q|d) is computed via a neural network. Then, these values are combined using a simple product-of-sum formula 318, which multiplies scores of all individual tokens:

$$P(Q|D) = \pi_{q \in Q} \Sigma_{d \in D} T(q|D) P(d|D) \quad (5)$$

In Eq. (5), P(d|D) denotes a probability that a document embedding is "generated" by a document. For context-independent embeddings, it is a maximum likelihood estimate, i.e., a normalized frequency of the term occurrence. In the case of contextualized embeddings, it is set to 1/|D|.

Turning to computation of lexical translation probabilities T(q|d) using the neural network. Another key step of this disclosure includes parameterizing conditional translation probabilities with a neural network. It proceeds as follows:

First, the system tokenizes the query and a document.

Next, the system employs the embedding network of FIG. 3 to generate embeddings 312 for query tokens (denotes as $w_q$) and embeddings 314 for document tokens (denoted as $w_d$). This approach works with both context-free and contextualized-embedding neural networks.

Lastly, using embeddings for queries and document tokens, the system uses a feed-forward neural-network to compute translation probabilities T(q|d). There are multiple ways to do this. In one implementation the system proceeds as follows:

1. $T(q|d)=\sigma(F_3(relu(F_2(relu(F_1([w_q, w_d, w_q °w_d]))))))$.
2. $w_q=P_q(tanh(layer\text{-}norm(embed_q(q))))$.
3. $w_d=P_d(tanh(layer\text{-}norm(embed_q(d))))$.
4. $F_i$, $P_d$, $P_q$ are fully connected layers.
5. $\sigma(x)$ is a sigmoid activation function.
6. $tanh(x)$ is a tanh activation function.
7. layer-norm is a layer normalization.
8. [x, y] denotes vector concatenation
9. x°y denotes the Hadamard product between vectors.

This is a method of computing, via a neural conditional translation probabilities' network, conditional translation probabilities of query tokens given document tokens based on token embeddings computed in steps 406 and 408.

Now consider precomputation and the sparsification of the query-document token probability matrix (neural export). When the ranking system of FIG. 3 combines the neural lexical translation layer with contextualized embeddings, as described in this disclosure, the overall system has state-of-the-art performance. However, it may also computationally expensive. Using context-free embeddings leads to a substantial drop in performance. However, the resulting model can be (1) sparsified and precomputed and (2) combined with simple TF*IDF models (such as BM25) and efficiently executed on CPU to improve early-stage ranking component 118 of FIG. 1.

Figure 4:
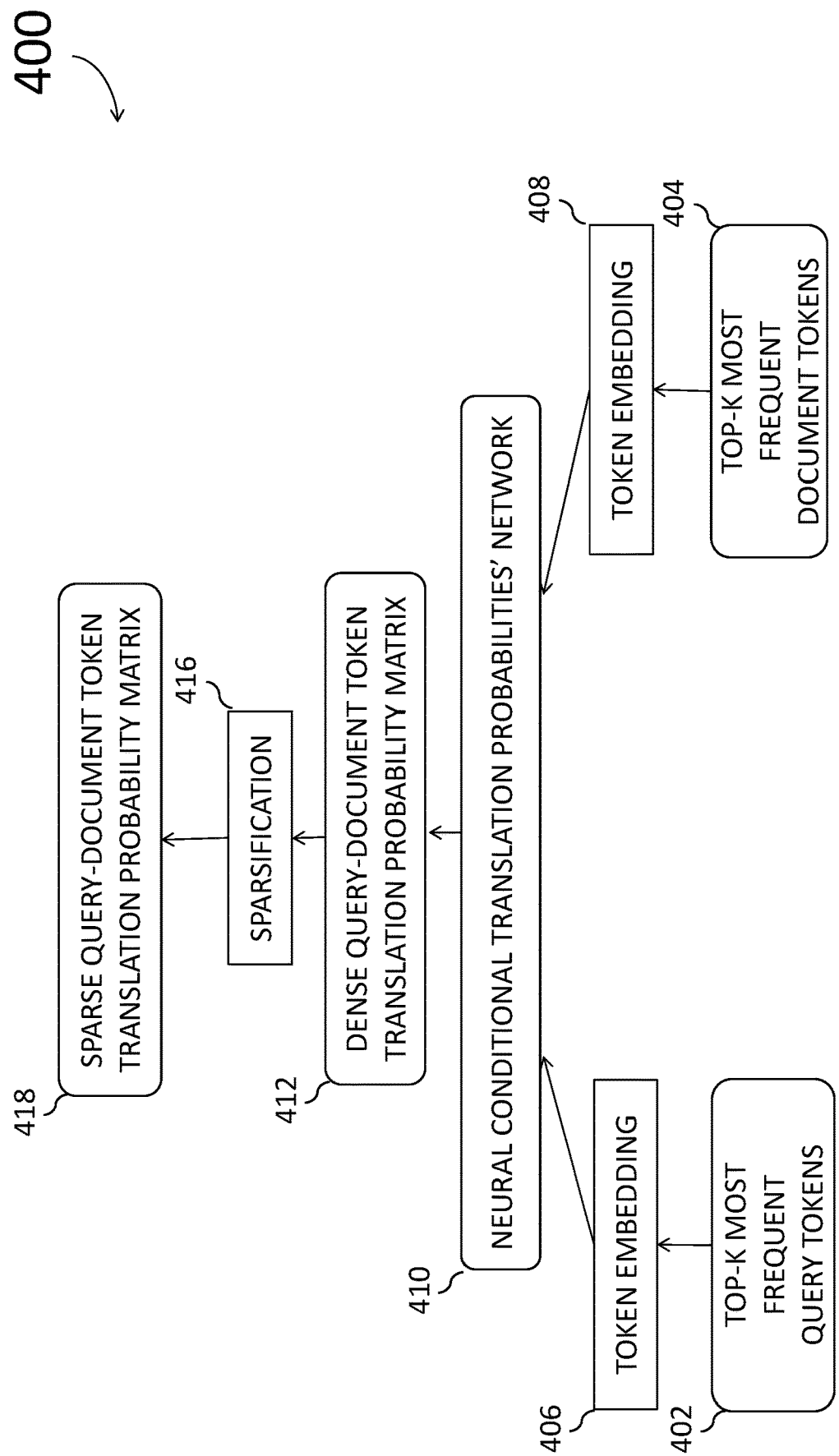
FIG. 4 is a flow diagram of a neural conditional translation probabilities' network sparsification process in which a context-independent token-embedding network is used.

FIG. 4 is a flow diagram of a model precomputation and sparsification 400 in which a context-independent token-embedding network is used. First, a processor or controller generates embeddings 406 and 408 for all frequent combinations of query 402 and document tokens 404. Then the controller or processor uses the context-independent model T(q|d) (e.g., computation of lexical translation probabilities using a neural network) to compute all possible pairwise translation probabilities/scores.

In step 410, a processor or controller is computing, via a neural conditional translation probabilities' network, conditional translation probabilities of query tokens given document tokens based on token embeddings computed in steps 406 and 408.

The result of the computation of Step 410 is the dense query-document token translation probability matrix which may be stored in step 412. For example, in Step 412, the output of step 410, from a GPU, is stored in CPU memory.

A sparsification step 416 discards all scores below an empirically chosen threshold. As described in this disclosure, this permits computing Eq. (1) efficiently on CPU. An example of a threshold includes a probability of one thousandths (0.1% or 0.001), 0.2%, 0.5%, 0.75%, 1% or 2% that one token is a match for another token. The result is a sparse query-document token translation probability matrix 418.

Figure 5:
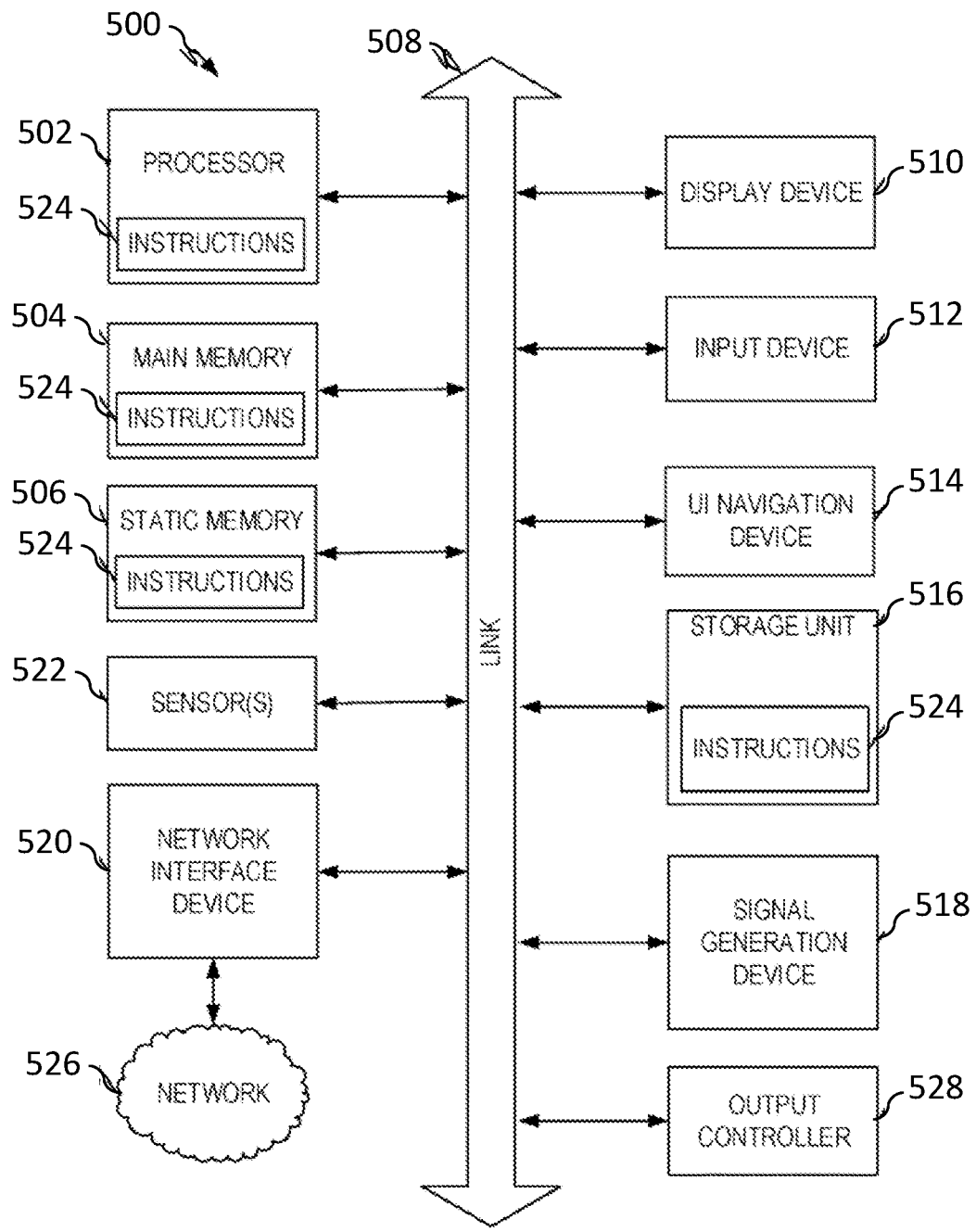
FIG. 5 is a block diagram of an electronic computing system.

Example Machine Architecture and Machine-Readable Medium. FIG. 5 is a block diagram of an electronic computing system suitable for implementing the systems or for executing the methods disclosed herein. The machine of FIG. 5 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 5 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 500 includes at least one processor 502 (e.g., controller, microcontroller, a central processing unit (CPU), a graphics processing unit (GPU), tensor processing unit (TPU), advanced processing unit (APU), or combinations thereof), one or more memories such as a main memory 504 a static memory 506, or other types of memory, which communicate with each other via link 508. Link 508 may be a bus or other type of connection channel. The machine 500 may include further optional aspects such as a graphics display unit 510 comprising any type of display. The machine 500 may also include other optional aspects such as an alphanumeric input device 512 (e.g., a keyboard, touch screen, and so forth), a user interface (UI) navigation device 514 (e.g., a mouse, trackball, touch device, and so forth), a storage unit 516 (e.g., disk drive or other storage device(s)), a signal generation device 518 (e.g., a speaker), sensor(s) 521 (e.g., global positioning sensor, accelerometer(s), microphone(s), camera(s), and so forth), output controller 528 (e.g., wired or wireless connection to connect and/or communicate with one or more other devices such as a universal serial bus (USB), near field communication (NFC), infrared (IR), serial/parallel bus, etc.), and a network interface device 520 (e.g., wired and/or wireless) to connect to and/or communicate over one or more networks 526.

The various memories (i.e., 504, 506, and/or memory of the processor(s) 502) and/or storage unit 516 may store one or more sets of instructions and data structures (e.g., software) 524 embodying or utilized by any one or more of the methodologies or functions described herein. These instructions, when executed by processor(s) 502 cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include storage devices such as solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically and unequivocally excludes carrier waves, modulated data signals, and other such transitory media, at least some of which are covered under the term "signal medium" discussed below.

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

While all of the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the general inventive concept.

What is claimed is:

1. A linguistic system comprising:
a processor programmed to:
receive a query and data indicating documents;
tokenize the query into a sequence of query tokens utilizing a neural condition translation probability network;
tokenize, each one of the data indicating documents into a sequence of document tokens;
convert the query tokens to query embeddings utilizing a neural contextualizing layer of the neural condition translation probability network;
convert the document tokens to document embeddings the neural contextualizing layer;
generate a matrix of embedding pairs for each of the query and the document embeddings;
compute, via the neural conditional translation probability network for each entry in the matrix of embedding pairs, a similarity score wherein the neural conditional translation probability network has been trained in a ranking task using a corpus of paired queries and respective relevant documents;
produce a ranking score, via the neural contextualizing layer, for each data indicating documents with respect to each query via a product-of-sum aggregation of the similarity scores for the respective query;
order the data indicating documents according to the ranking score of the documents; and
output the data indicating document and associated ranking score of the data indicating document.

2. The linguistic system of claim 1, wherein the neural network has been trained mono-lingually.

3. The linguistic system of claim 1, wherein the query embeddings or document embeddings are produced using a Transformer model.

4. The linguistic system of claim 1, wherein the product-of-sum aggregation is non-contexualized and is expressed as $$P(Q|D) = \prod_{q \in Q} \sum_{i=1}^{|D|} \frac{T(\text{embed}_q(q)|\text{embed}_d(d_i))}{|D|}$$

in which Q is query, D is the data indicating document, q is query token, d is document token, $\text{embed}_q$ (q) is query embeddings of the query token, $\text{embed}_d$ (d) is document embeddings of the document token i, T is a conditional translation, and P is the ranking score.

5. The linguistic system of claim 1, wherein the product-of-sum aggregation is contextualizied and is expressed as $$P(Q|D) = \prod_{q \in Q} \sum_{i=1}^{|D|} \frac{T(\text{embed}_q(q, d_i)|\text{embed}_d(q, d_i))}{|D|}$$

in which Q is query, D is the data indicating document, q is query token, d is document token, $embed_q(q,d_i)$ is a contextualized embedding of the query token, $embed_d(q,d_i)$ is a contextualized embedding of the document token $d_i$, T is a conditional translation, and P is the ranking score.

6. The linguistic system of claim 1, wherein the processor is more than one processor.

7. The linguistic system of claim 1, wherein the query is input via a microphone.

8. The linguistic system of claim 7, wherein the output is via a speaker.

9. A linguistic system comprising:
a processor programmed to:
receive a query and data indicating document;
tokenize the query into a sequence of query tokens utilizing a neural condition translation probability network;
tokenize the data indicating document into a sequence of document tokens;
generate a matrix of token pairs for each of the query and the document tokens;
retrieve for each entry in the matrix of token pairs, a precomputed similarity score produced by a neural conditional translation probability network, wherein the neural network has been trained in a ranking task using a corpus of paired queries and respective relevant documents;
produce a ranking score, via the neural contextualizing layer, for each document with respect to each query via a product-of-sum aggregation of each of the similarity scores for the respective query; and
output the data indicating document and associated ranking score of the document.

10. The linguistic system of claim 9, wherein the product-of-sum aggregation is $$P(Q|D) = \prod_{q \in Q} \sum_{d \in D} T(q|d) P(d|D)$$

in which Q is query, D is the data indicating document, q is query token, d is document token, T(q|d) is a precomputed conditional translation probability of query token q being aligned with document token d, P(Q|D) is the ranking score, and P(d|D) is a maximum likelihood estimate of the probability of occurrence of token d being in document D.

11. The linguistic system of claim 9, wherein the neural network is trained mono-lingually.

12. The linguistic system of claim 9, wherein the neural conditional translation probability network uses context independent embeddings for query tokens or document tokens.

13. The linguistic system of claim 12, wherein a dense query-document token translation probability matrix, produced by the neural conditional translation probability network, is sparsified through discarding probabilities below a threshold.

14. The linguistic system of claim 12, wherein the query is input via a microphone and the output is via a speaker.

15. A non-transitory computer readable medium comprising instructions for neural conditional translation probability network ranking that, when executed by a processor of a computing device, cause the computing device to perform operations including to:
receive a query and data indicating documents;
tokenize the query into a sequence of query tokens utilizing a neural condition tokenize, for each document, the documents into a sequence of document tokens;
convert the query tokens to query embeddings utilizing a neural contextualization, layer of the neural condition translation probability network;
convert the document tokens to document embeddings utilizing the neural contextualizing layer;
generate a matrix of embedding pairs for each of the query and the document embeddings;
compute, via the neural conditional translation probability network for each entry in the matrix of embedding pairs, a similarity score wherein the neural network has been trained in a ranking task using a corpus of paired queries and respective relevant documents;
produce a ranking score for each document with respect to each query via a product-of-sum aggregation of each of the similarity scores for the respective query; and
output an order of the data indicating documents according to the ranking score of the data indicating documents.

16. The medium of claim 15, wherein the neural conditional translation probability network has been trained monolingually.

17. The medium of claim 15, wherein the query embeddings or document embeddings are produced using a Transformer model.

18. The medium of claim 15, wherein the product-of-sum aggregation is non-contexualized and is expressed as $$P(Q|D) = \prod_{q \in Q} \sum_{i=1}^{|D|} \frac{T(embed_q(q) | embed_d(d_i))}{|D|}$$

in which Q is query, D is the data indicating document, q is query token, d is document token, $embed_q$ (q) is query embeddings of the query token, $embed_d$ (d) is document embeddings of the document token $d_i$, T is a conditional translation, and P is the ranking score.

19. The medium of claim 15, wherein the product-of-sum aggregation is contextualizied and is expressed as $$P(Q|D) = \prod_{q \in Q} \sum_{i=1}^{|D|} \frac{T(embed_q(q, d_i) | embed_d(q, d_i))}{|D|}$$

in which Q is query, D is the data indicating document, q is query token, d is document token, $embed_q$ (q,$d_i$) is a contextualized embedding of the query token, $embed_d$ (q,$d_i$) is a contextualized embedding of the document token $d_i$, T is a conditional translation, and P is the ranking score.

* * * * *